United States Patent
Hurst et al.

(10) Patent No.: US 6,574,911 B1
(45) Date of Patent: Jun. 10, 2003

(54) TACKLE ORGANIZER

(75) Inventors: Rick Hurst, Flippin, AZ (US); Mark Zwicker, Mountain Home, AZ (US)

(73) Assignee: Genmar IP LLC, Minneapolis, MN (US)

( * ) Notice: Subject to any disclaimer, the term of this patent is extended or adjusted under 35 U.S.C. 154(b) by 0 days.

(21) Appl. No.: 10/052,694

(22) Filed: Jan. 18, 2002

(51) Int. Cl.[7] ............................................... A01K 97/06
(52) U.S. Cl. ..................... 43/54.1; 114/343; 224/406; 312/198
(58) Field of Search .................. 43/54.1; 312/198; 224/406; 114/343

(56) References Cited

U.S. PATENT DOCUMENTS

| | | | |
|---|---|---|---|
| 1,621,536 A | | 3/1927 | Handte |
| 3,574,964 A | * | 4/1971 | Ownbey ................. 248/224.7 |
| 3,674,170 A | | 7/1972 | Thorpe et al. |
| 3,765,632 A | | 10/1973 | Riggs |
| 3,815,519 A | * | 6/1974 | Meyer ......................... 108/61 |
| 3,824,733 A | | 7/1974 | Cordell, Jr. |
| 3,834,340 A | | 9/1974 | Thorpe |
| 3,889,805 A | | 6/1975 | Korten |
| 4,170,801 A | | 10/1979 | Ward |
| 4,226,348 A | * | 10/1980 | Dottor et al. ............. 217/12 R |
| 4,513,526 A | | 4/1985 | Grace et al. |
| 4,569,301 A | * | 2/1986 | Pyburn ....................... 114/343 |
| 4,628,628 A | | 12/1986 | Burgin et al. |
| 4,662,303 A | | 5/1987 | Duff |
| 4,671,009 A | | 6/1987 | Faunce |
| 4,770,327 A | | 9/1988 | Fortson |
| 4,805,859 A | | 2/1989 | Hudson |
| 4,827,864 A | | 5/1989 | LaMontagne et al. |
| 4,974,537 A | | 12/1990 | Martin |
| 5,048,447 A | | 9/1991 | Vicari |
| 5,094,375 A | | 3/1992 | Wright |
| D326,378 S | | 5/1992 | Yunger et al. |
| 5,127,355 A | | 7/1992 | Magers et al. |
| D335,577 S | | 5/1993 | Malmanger et al. |
| 5,395,019 A | | 3/1995 | Christensen |
| 5,421,283 A | | 6/1995 | Bruggemann et al. |
| 5,426,885 A | | 6/1995 | Wittman |
| 5,486,979 A | * | 1/1996 | Bowen et al. ............... 361/640 |
| 5,582,305 A | * | 12/1996 | Howell et al. ........... 211/126.1 |
| 5,582,313 A | | 12/1996 | Envall |
| 5,673,801 A | * | 10/1997 | Markson ..................... 211/184 |
| 5,704,158 A | | 1/1998 | Whiteaker |
| 5,803,276 A | * | 9/1998 | Vogler ......................... 108/60 |
| 5,899,544 A | | 5/1999 | James et al. |
| 5,915,689 A | * | 6/1999 | Everdyke et al. ........... 271/113 |
| 5,971,173 A | * | 10/1999 | Valiulis et al. .............. 211/184 |
| 5,975,002 A | | 11/1999 | Rieger |
| 6,142,322 A | * | 11/2000 | Smith et al. ................ 211/183 |
| 6,401,942 B1 | * | 6/2002 | Eckert ........................ 211/184 |

FOREIGN PATENT DOCUMENTS

JP        55-076785        6/1985

OTHER PUBLICATIONS

Page entitled "Hydra–Sports Features" taken from catalog entitled "OMC® Hydra–Sports®," *Hydra–Sports, Inc., 880 Butler Road, Murfreesboro, TN 37130,* 3 pgs. (including front and back covers of catalog) (1992).
Page taken from brochure entitled "Gambler® Bass Boasts—Intimidator® I," *Maritec Industries, Inc., 5980 Lakehurst Drive, Orlando, FL 32819,* 3 pgs. (including front and back covers of catalog) (No Date*).
Pages entitled "Features" taken from catalog entitled "Javelin Boats," *Javelin Boats, Inc., 880 Butler Road, Murfreesboro, TN 37130,* 4 pgs. (including front and back covers of catalog) (1992).
Pages entitled "Standard & Optional Features" taken from catalog entitled "Let' EM Eat Weak. OMC Javelin," *Javelin Boats, 880 butler Road, Murfreesboro, TN 37130,* 4 pgs. (Including front and back covers of catalog) (1996).

* cited by examiner

Primary Examiner—Charles T. Jordan
Assistant Examiner—Bret Hayes
(74) *Attorney, Agent, or Firm*—Merchant & Gould P.C.

(57) ABSTRACT

A tackle management system and organizer that fits within inboard storage locations of a boat. The system includes two tracks and a plurality clips that define compartments for tackle or utility boxes. The clips and tracks are adapted to securely store a variety of sized tackle boxes. The system may be used in original equipment installations or as a retrofit installation.

24 Claims, 7 Drawing Sheets

TACKLE ORGANIZER

TECHNICAL BACKGROUND

The principles disclosed relate to a system of organizing and storing fishing equipment. More particularly, this disclosure concerns an organizer that mounts within a storage compartment of a boat for organizing and storing fishing tackle containers.

BACKGROUND

A wide variety of storage systems have been utilized to store and organize fishing tackle and equipment. Common arrangements for use on a boat involve large, recessed areas or compartments, pre-configured directly into the boat, having predetermined compartment sizes. Other arrangements involve storage box structures that attach to the boat in areas that obstruct the fishing platform or user space. The compartment areas and storage structures are generally fixed in overall envelope size and consume a defined amount of space regardless of fishing tackle content stored.

In general, improvement has been sought with respect to such arrangements, generally to: provide expandability or contractibility of storage compartments; permit flexibility with regards to overall storage capacity; better utilize space constraints; permit adaptability to a variety of boat configurations; provide better access and organization of stored fishing tackle; and permit retrofitability to a variety of existing boats configurations.

SUMMARY

One aspect of the present invention relates to an enhanced arrangement for storing tackle in a boat. Another aspect of the present invention relates to a tackle management kit that retrofits to a boat and the method of organizing tackle boxes therein.

DETAILED DESCRIPTION

With reference now to the various figures in which identical elements are numbered identically throughout, a description of various exemplary aspects of the present disclosure will now be provided.

Figure 1:
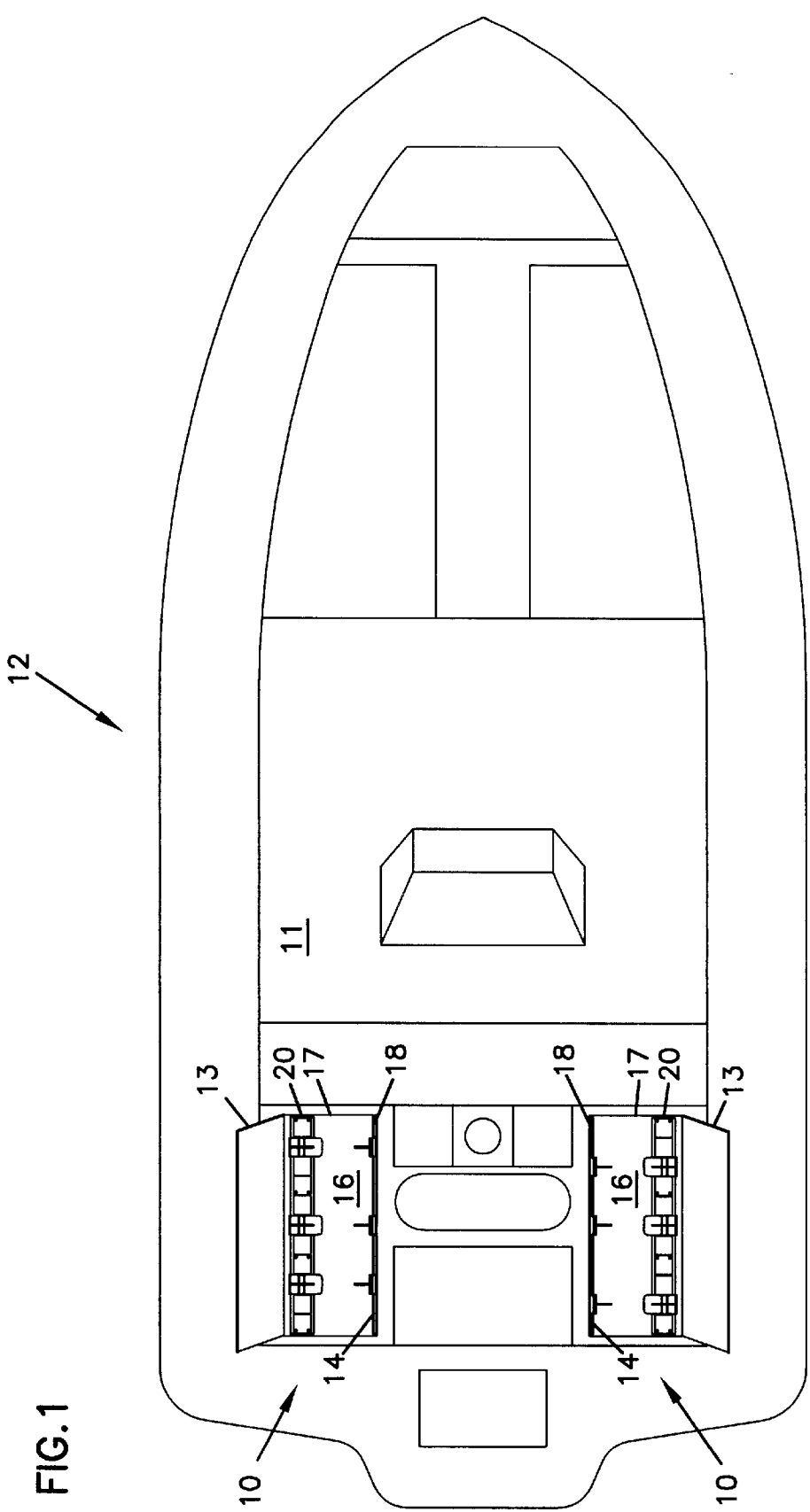
FIG. 1 is a top plan view of one embodiment of a tackle management system installed on a boat in accordance with the principles of this disclosure.
Figure 2:
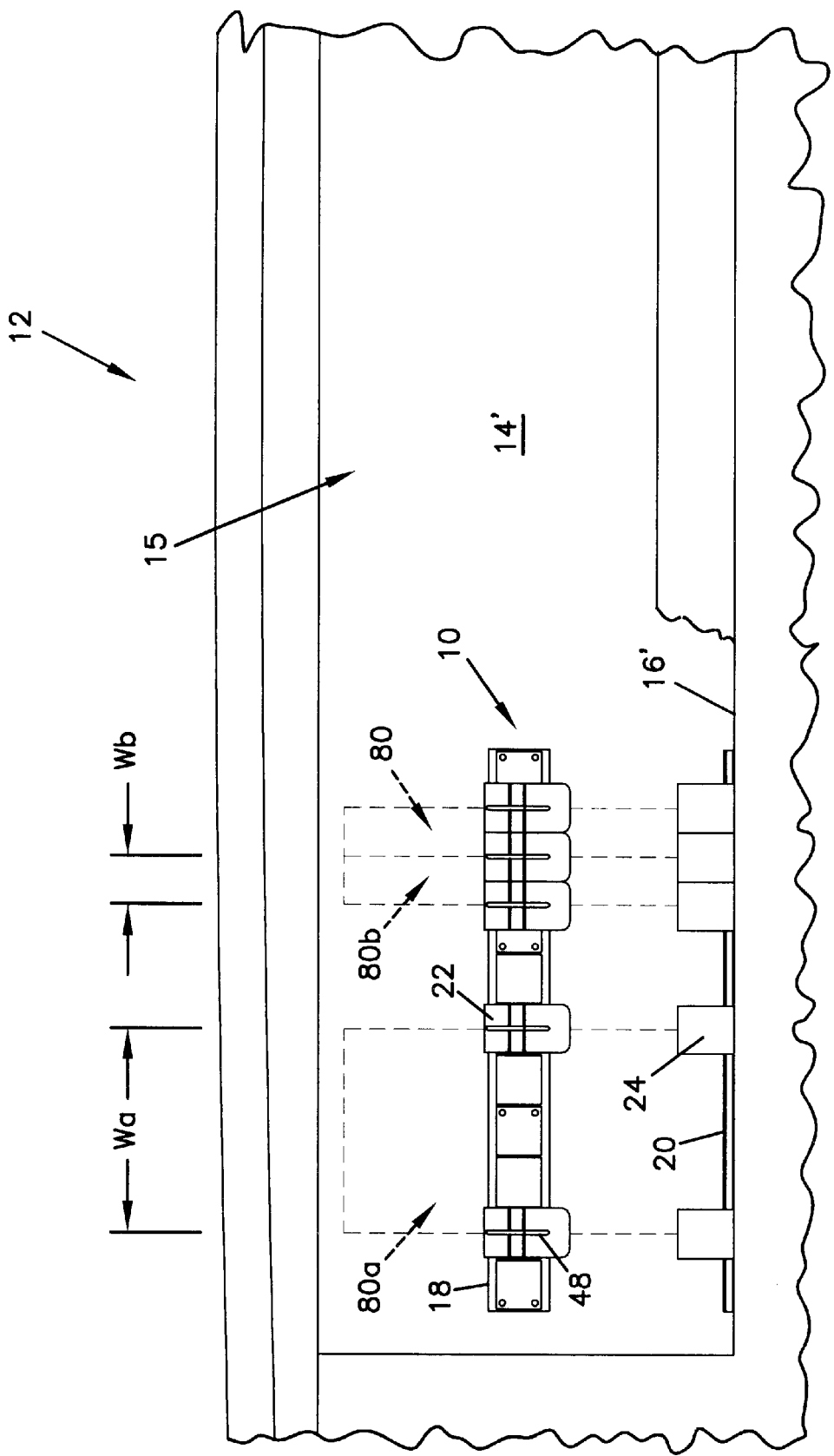
FIG. 2 is a front view of a tackle management system similar to that of FIG. 1 installed on a boat in an alternative arrangement in accordance with the principles disclosed.

FIGS. 1 and 2 depict a tackle management system and organizer 10 used in a boat 12 either as an original equipment installation or a retrofit kit. In accordance with the principles disclosed, the tackle management system or organizer 10 concerns a unique track and clip storage arrangement.

As illustrated in FIG. 1, the tackle management system 10 may mount within a floor cavity or bottom compartment 17 of a boat 12. The bottom or lower storage compartment 17 is typically formed within the main inboard walking area or platform 11 of the boat. Preferably the compartment comprises a flat bottom surface 16 and a side surface 14. More preferably, the side and bottom surfaces 14 and 16 form about a 90-degree angle.

In an alterative arrangement, as illustrated in FIG. 2, the tackle management kit 10 may be mounted in a side cavity or compartment 15 located alongside the main inboard walking area of a boat. The side compartment also preferably comprises a flat bottom surface 16' and a side surface 14' wherein the side and bottom surfaces 14' and 16' form about a 90-degree angle.

It is to be understood that the side and bottom surfaces 14, 14' and 16, 16' of the compartments may consist of other angular configurations. The surfaces described as generally perpendicular means that the surfaces form an angle between 75 degrees and 105 degrees.

It is also to be understood that the tackle management system 10 may be mounted or installed in non-compartmental areas of a boat, such as in the platform or deck area of a boat.

Figure 3:
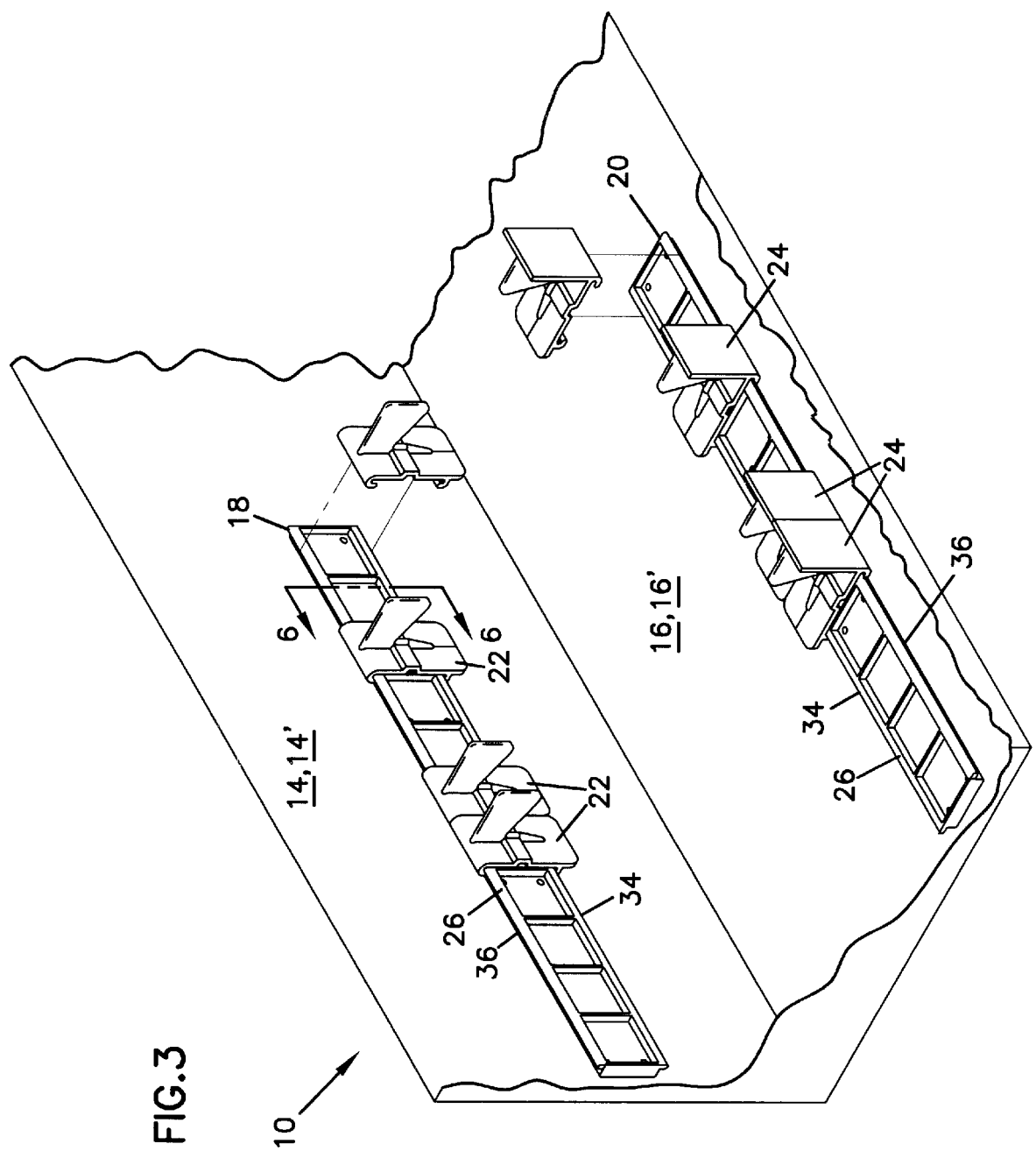
FIG. 3 is a perspective view of the tackle management system as shown in FIGS. 1 and 2.

FIG. 3 is a more detailed illustration of the tackle management system 10 generally shown in FIGS. 1 and 2. The tackle management system or tackle organizer 10 mounts to the boat's side surface 14, 14' and bottom surface 16, 16'. The system 10 comprises two elongated bases, rails or tracks, including a first track 18 and a second track 20. The system 10 also includes a plurality of clips or attachment members, including a plurality of first attachment members 22 and a plurality of second attachment members 24. The attachment members may also be referred to as box locks.

The tracks 18 and 20 are preferably identical in configuration. The attachment members 22 and 24 have similar configurations with the exception of a retaining feature, which will be discussed in greater detail hereafter. In designing identical tracks and similar attachment members, efficiency and cost of manufacture were considered while the functionality of the system preserved. The tracks and attachment members may be manufactured from plastic, such as polypropylene or similar composite. Other suitable materials of manufacture are contemplated. In other embodiments, the tracks need not have identical configurations.

Figure 4:
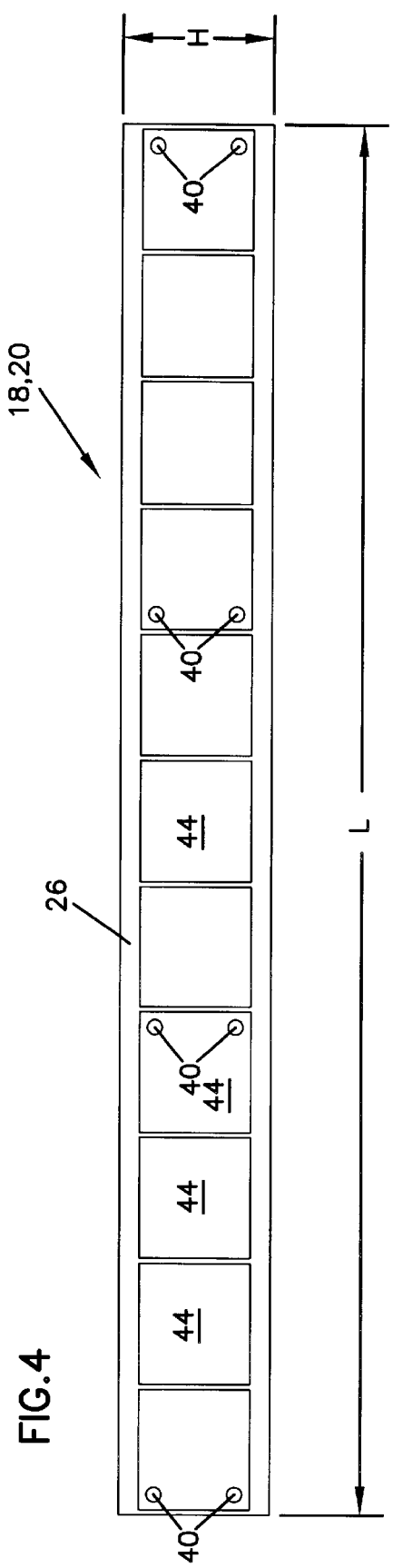
FIG. 4 is a top view of one embodiment of a track component of the tackle management system shown in FIG. 3.
Figure 5:
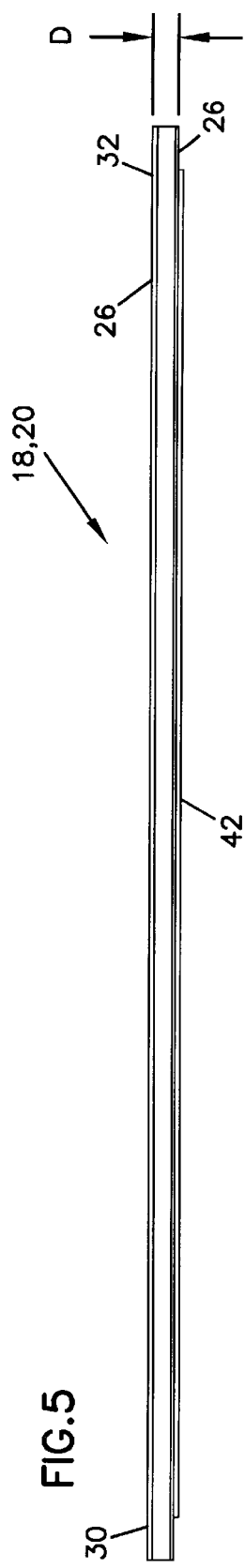
FIG. 5 is a front view of the track component of FIG. 4.

As best shown in FIGS. 4 and 5, the tracks 18 and 20 comprise a front surface 26 and a back surface 28. The front and back surfaces 26 and 28 extend between a first end 30 and a second end 32. The track 18, 20 has a length L, a height H, and a depth D. The length of the track may vary according to the configuration of the boat within which the tackle management system will be installed. Typically the length of the first track 18 is generally the same as the length of the second track 20. The tackle management system of FIGS. 1–3, illustrates tracks 18 and 20 having a length in the range of 12 to 24 inches. More specifically, the illustrated tracks 18 and 20 have a length of about 18 inches. It is to be understood that the tracks may be longer or shorter to accommodate: boats having more or less storage space, and, fishermen who require organization of more or less fishing tackle.

The height H of the tracks 18 and 20 is preferably in the range of 1 inch to 3 inches. A more preferred range of height is between 1.5 and 2.5 inches. A most preferred height is less than about 2 inches. The depth D of the tracks 18 and 20 is preferably in the range of ¼ to ⅝ inch. A more preferred range of depth is less than ½ inch. A most preferred depth is about ⅜ inch.

The configuration of the length, height, and depth is important in that overall space capacity inboard a boat is limited. Compartment storage space inboard a boat is even more limited. It is desirable to provide a tackle management system having a large storage capacity, while minimizing space utilization when the management system or organizer is not in use. In accord with these principles, the configuration of the tracks is designed to minimize space utilization while still providing a large storage capacity potential.

One advantage of the present system is that the tackle management system is configured to fit and provide storage capacity within pre-existing compartments of a boat to avoid creating obstacles on the boat platform. Traditional fishing tackle organizers are placed directly on the boat platform or extend into the inboard walking area causing potential hazards for fishermen. Another advantage of the tackle management system is that the system is designed to minimize space utilization even within the storage compartments of the boat. Specifically, while the tackle organizer is not fully utilized, other storage components may be placed within the storage compartment without interference from the tackle organizer. In other words, the tackle management system or organizer is constructed to utilize minimal fixed space when not used in its fullest capacity.

Figure 6:
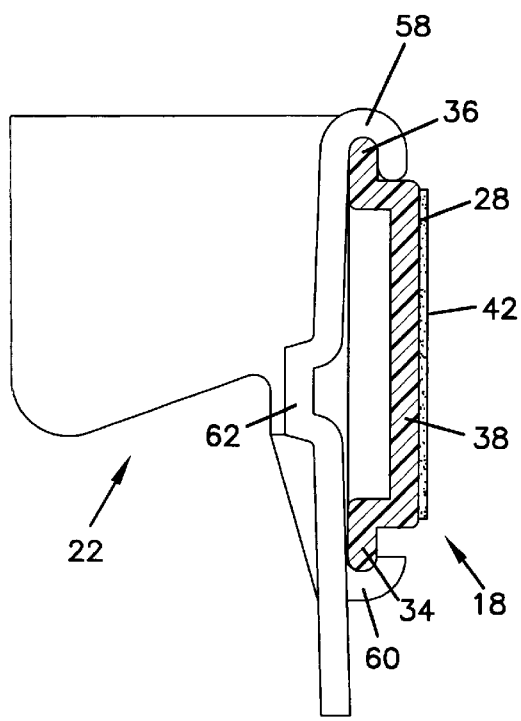
FIG. 6 is a side view of the track assembly of FIG. 3 taken along line 6—6.

Referring now to FIGS. 3 and 6, the tracks 18 and 20 include an inner edge 34 and an outer edge 36. The edges 34 and 36 extend beyond a base portion 38 of each track 18, 20. The edges 34 and 36 of the tracks interact with the attachment members as will be described in greater detail hereafter.

Each track 18, 20 further comprises a means for attaching or securing the track 18, 20 to the surface 14, 16 of a boat. In the illustrated embodiment of FIG. 4, the track 18, 20 includes a plurality of holes 40 spaced apart at a predetermined distance. The holes 40 are used to fasten the track 18, 20 to the surface of the boat with fasteners (not shown). In the alternative, the track 18, 20 may be fastened to a boat surface by an adhesive 42 (shown in FIGS. 5 and 6) applied between the back surface 28 of the track and the boat surface. One type of adhesive comprises an adhesive strip manufactured by 3M, identified as 3M VHB™. The strip is adhered to the back surface 28 of the track 18, 20. The strip includes a separable cover strip (not shown) that is removed to expose an adhesive surface for adhesion of the track to the boat surface.

The track 18, 20 may also include a series of indentations or recesses 44 located on the front surface 26 of the track. The illustrated embodiment shows a plurality of recesses 44 having a square configuration, specifically, eleven square recesses positioned in sequence. Other recess shapes and configurations are contemplated. Some embodiments may also include various numbers of recesses, for example, only one recessed area or tray configured along the length of the track. The recesses illustrated aid in cost efficient manufacture by reducing material content of the track. Additionally the recesses 44 may be used as identifiers or locaters. For example, the width of the recesses 44 may be configured to correspond to the width of a particular tackle container to be stored in the tackle management system. This would assist users in placement or spacing of the attachment members or clips to fit the particular tackle containers. Or, labels (not shown) may be affixed at the recesses to indicate which storage containers have been removed and assist in returning the storage containers to their proper storage slots.

Figure 8:
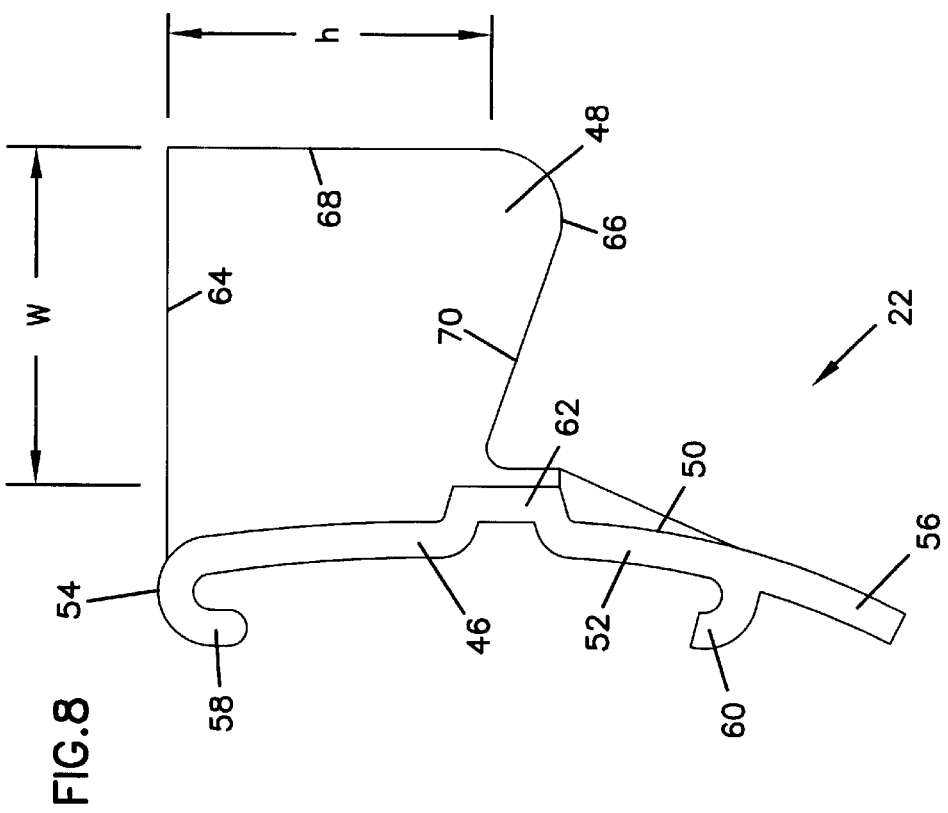
FIG. 8 is a side view of the attachment member of FIG. 7.
Figure 7:
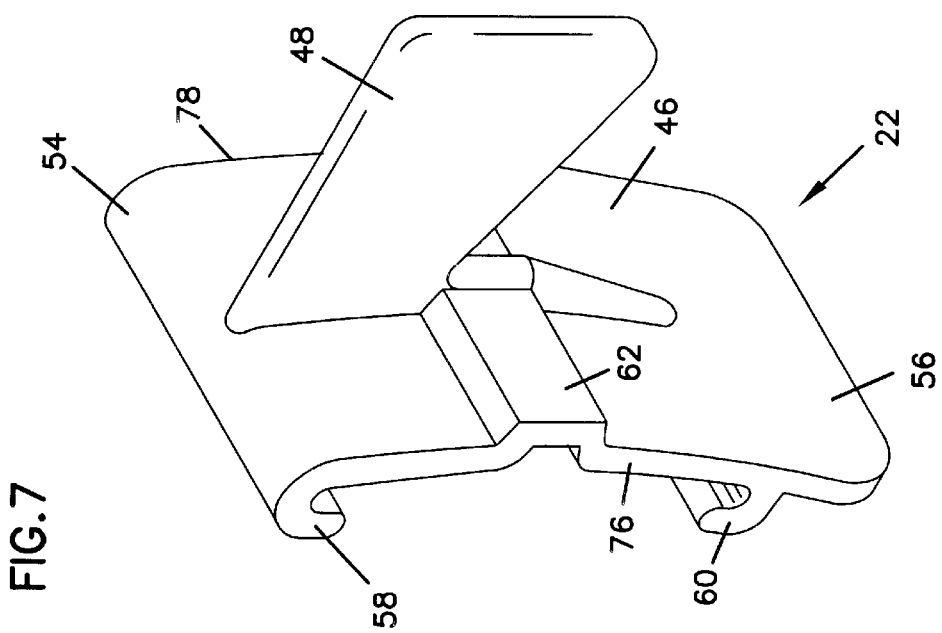
FIG. 7 is an enlarged perspective view of one embodiment of an attachment member of the tackle management system shown in FIG. 3.

Referring now to FIGS. 7 and 8, the first attachment member or clip 22 of the tackle management system 10 generally includes a base or main portion 46 and a fin portion 48. The main portion 46 has a concave curvature defining a convex front side 50 and a concave rear side 52. The main portion also includes first and second securing members 58 and 60. The first securing member 58 extends from the concave rear side 52 and is located proximate a first end 54. The second securing member 60 extends from the concave rear side 52 and is located proximate a second end 56 of the main portion 46.

In the illustrated embodiment, each securing member 58 and 60 comprises a hooked or curved structure that extends across the rear side 52 from a first edge 76 of the main portion 46 to a second edge 78. The securing members are positioned along the concave rear side 52 of the attachment member to cooperate with the edges of the track, as will be discussed in greater detail hereafter. It is contemplated that the securing members may comprise, for example, a securing member generally centered between the first and second edges 76 and 78 but extending a distance shorter than from edge to edge. In another embodiment, a plurality of securing members may be positioned at the first end along with a plurality of securing members positioned at the second end.

A channel 62 is formed in the main portion 46 between the first end 54 and the second end 56. The channel is positioned in the area where the main portion 46 flexes or pivots in use and provides reinforcement strength where that flexure causes structural stress.

The fin portion 48 of the attachment member 22 extends outwardly from the upper end 54 of the convex front side 50 of the main portion 46. Generally the fin portion 48 is centered between the first edge 76 of the main portion and the second edge 78. The fin portion 48 comprises a height h and a width w. The height h of the fin portion is defined as the distance between a first extension edge 64 and the beginning of a radius 66 formed between a front leading edge 68 and a second extension edge 70. The height h is preferably in the range of 0.6 inches to 1.1 inches, preferably about 0.9 inches. The width w of the fin portion is defined as the distance between the front leading edge 68 and the channel 62. The width is preferably in the range of 0.5 inches to 2.0 inches. A more preferred range of width is between 0.75 and 1.5 inches. A most preferred width is less than about 1.25 inches.

The front leading edge 68 is generally perpendicular to the first extension edge 64, although other angular configurations are contemplated. As illustrated, the second extension edge 70 may angle from the radius 66 toward the main portion 46 of the attachment member 22. Preferably the second extension edge 70 angles such that the fin portion 48 does not extend across the channel or pivot hinge area 62 and does not interfere with flexure of the main portion by structurally stiffening the channel or pivot hinge area. Various fin constructions are contemplated, specifically the radius may be enlarged or reduced and the front, first extension, and second extension edges may incorporate other angular configurations.

Figure 10:
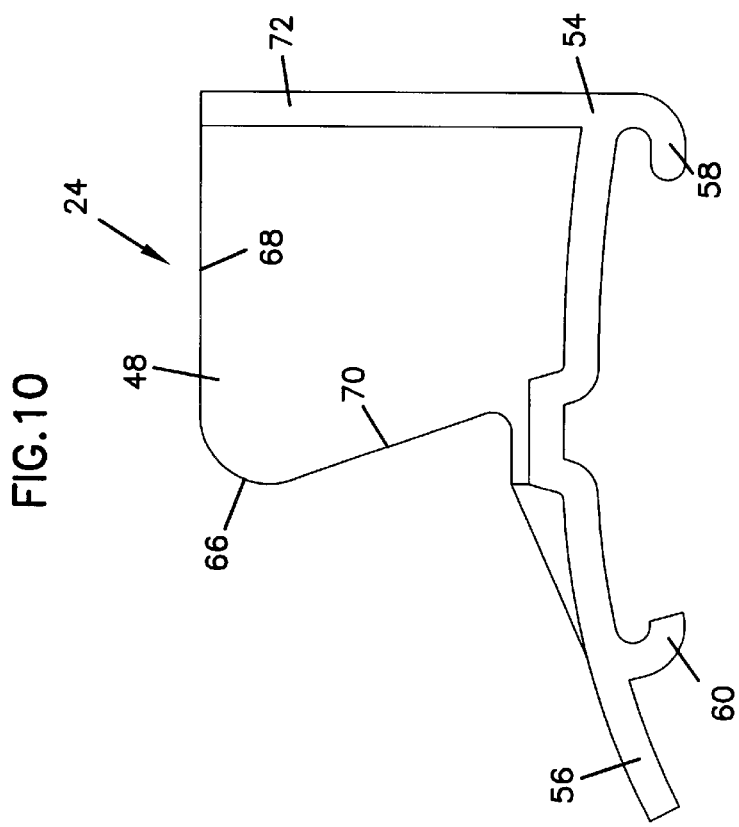
FIG. 10 is a side view of the attachment member of FIG. 9.
Figure 9:
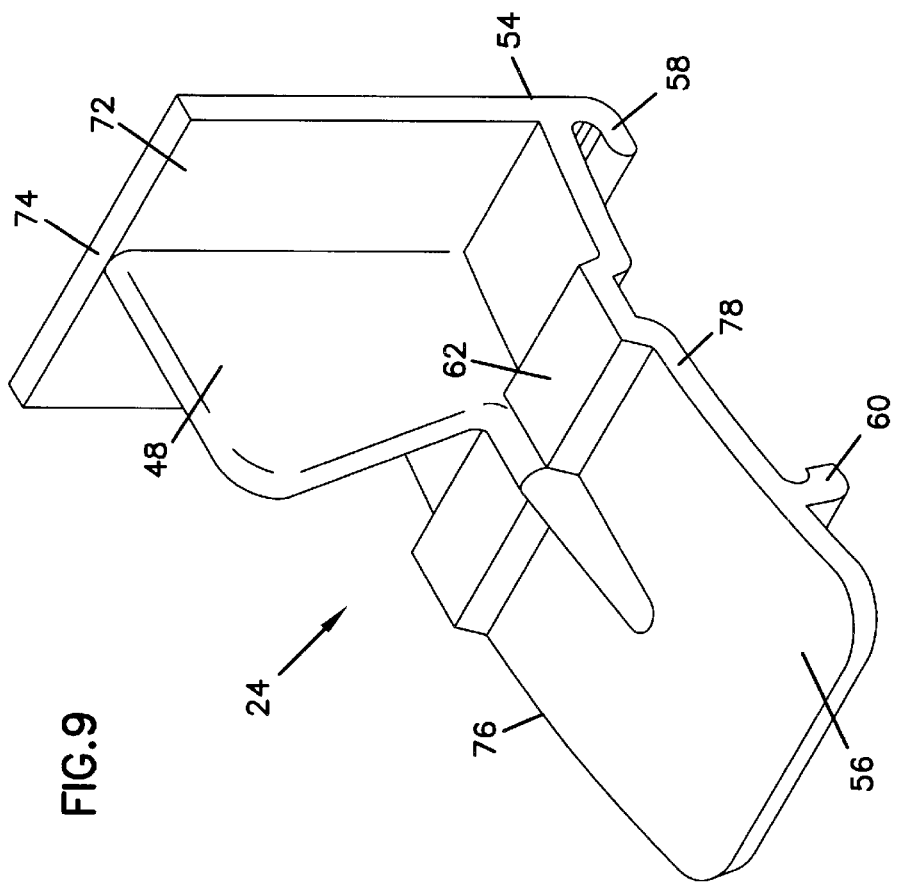
FIG. 9 is an enlarged perspective view of another embodiment of an attachment member of the,tackle management system shown in FIG. 3.

The second attachment member 24, shown in FIGS. 9 and 10, is similar to the first attachment member 22 with the exception of a retaining member 72. The retaining member 72 extends from the front side 50 of the main portion 45 at the first end 54. In the preferred embodiment, the retaining member 72 is perpendicular to the fin portion 48 and essentially intersected by the fin portion 48 at a mid-region 74. The illustrated retaining member extends from the first edge 76 of the main portion 46 to the second edge 78; or in other words, from the fin portion 48 to the first and second edges 76 and 78 on either side of the fin portion. In the illustrated embodiment and as described, the second attachment 24 generally has a T-shape cross-section. It is contemplated that the retaining members may extend a length from the fin portion 48 toward the first and second edges 76 and 78 that is shorter than the length from the fin portion to the first and second edges.

In an alternative embodiment, the attachment members 22 and 24 may be made integral with the tracks 18 and 20. For example, the members 22 and 24 may comprise similar fin portions and retaining member as described earlier, that are formed directly integral with the tracks. Additionally, the members may be fixedly coupled or permanently mounted to the track.

The tackle management system is designed for retrofit to a boat. In the alternative, the tackle management system may also be used in original equipment installations. The tracks are adapted to fit within various sizes of storage areas. Generally, the tackle management system is located either in a side storage area of the boat as shown in FIG. 2 or in a floor storage compartment as shown in FIG. 3. The tracks 18 and 20 are preferably positioned on generally perpendicular surfaces and secured by either fasteners (not shown) or the optional adhesive strip 42. It is contemplated that the system may also be secured to non-perpendicular surfaces or to a single horizontal surface or a single vertical surface.

The tracks are designed to accommodate various sizes of fishing tackle. Generally, the tackle management system 10 is used in conjunction with the storage of fishing tackle boxes or other similar utility boxes. Such boxes typically have a rectangular configuration and include multiple storage slots for fishing lures within the box or container. An exemplary container is a PLANO stow away box, model number 3455-00, manufactured by PLANO Molding Company. This particular stow away box is only an example. Utility or tackle boxes may come in a wide range of heights, lengths, and widths. In storing utility or tackle boxes, it is preferred that the location and orientation of the tracks 18 and 20 and attachment members 22 and 24 correspond to the dimensions of the preferred tackle box configuration.

Figure 11:
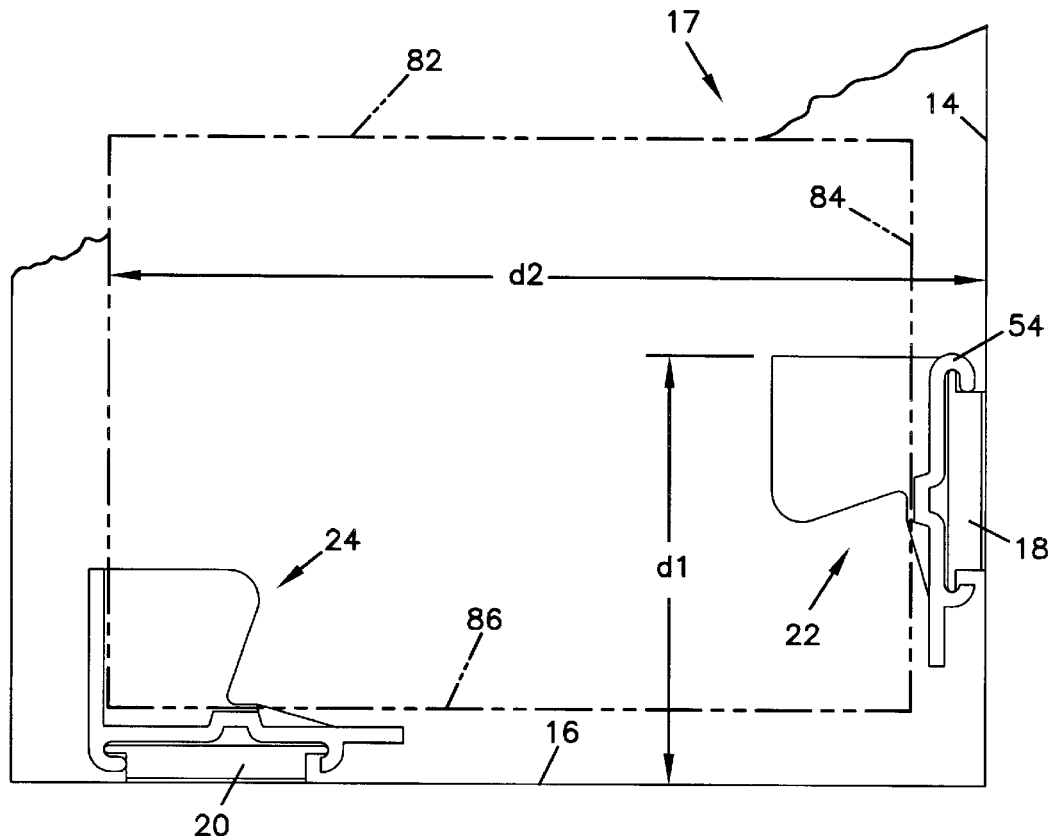
FIG. 11 is a side view of the tackle management system shown in FIG. 1.

Specifically, in a horizontal storage application such as that shown in FIGS. 1 and 11, the first track 18 is located a first distance d1 from the bottom surface 16 of the bottom compartment 17. The first distance d1 is approximately such that when a tackle box 82 (shown in phantom) is stored, the first ends 54 of the first attachment members are mid-height or adjacent the midpoint of the vertical side 84 of the tackle box 82. More specifically, the outer edge 36 of the first track 18 is preferably located no higher than halfway up the vertical side 84 of the tackle box 82. The second track 20 is located a second distance d2 from the side surface 14 of the bottom compartment 17. The second distance d2 corresponds to the overall length or horizontal side 86 of the tackle box 82. As best shown in FIG. 1, it is preferable that the first track 18 be located on a side surface of the bottom compartment so that a lid 13 of the bottom compartment opens away from the first track 18. This allows easy access to tackle boxes secured in the tackle management system 10.

In a vertical storage application such as that shown in FIG. 2, the first and second tracks 18 and 20 are similarly located. For example, the outer edge 36 of the first track 18 is generally located at mid-height of the vertical side of the tackle box and the second track 20 is located to correspond to the horizontal side of the tackle box.

Referring back to FIGS. 3 and 6, first attachment members or clips 22 attach to the first track 18 by engaging the first securing member 58 to the outer edge 36 of the first track 18 and pressing the channel 62 inward toward the front surface 26 of the track to snap or click the second securing member 60 in place around the inner edge 34 of the track. In particular, the first securing member 58 is hooked to the outer edge 36 of the track. The first attachment member 22 is flexed by pressing on the main portion 46 to lessen the degree of concavity of the main portion and thereby effectively lengthen the overall longitudinal dimension of the attachment member. Flexing the attachment member permits the second securing member 60 to grasp or engage the inner edge 34 of the track. Releasing the pressure on the attachment member decreases the flexure and the overall length of the attachment member to provide a snug connection between the attachment member and the track. The attachment member is similarly removed from the track by slightly flexing the main portion inward to remove or release the second securing member 60 from engagement with the inner edge 34. The second attachment members or clips 24 are attached to and removed from the second track 20 in similar fashion.

The fit between the securing members of the attachment members and the track is such that the attachment members remain in position until removed by a user. It is contemplated that the attachment members may be configured so that a user can slide or move the attachment member along the track for positioning purposes, yet still maintain their stationary location after positioning.

By assembling a number of attachment members to the tracks, storage areas or compartments 80 (shown in phantom in FIG. 2) are formed for holding and storing fishing tackle containers. The compartments 80 are defined by the space between the fin portions 48 of attachment members 22 and 24. In other words, the fins divide the storage space into compartmental areas. In either vertical or horizontal applications, the first attachment members 22 essentially function as a guide or divider of the compartmentalizing storage space; the second attachment members 24 provides a cornering support piece (i.e. retaining member 72) to retain stored objects against the opposing wall 14, 14' of the compartment.

Another feature of the disclosed system relates to the versatility of the storage areas or compartments. Because the clips 22 and 24 can be positioned anywhere along the length of the tracks, the compartments may comprise a variety of selected widths. For example, a first compartment $80_a$ having a width $W_a$ may be wider or narrower than a second compartment $80_b$ having a width $W_b$ to accommodate fishing tackle of differing sizes. It is contemplated that containers having non-symmetrical shapes may also be stored in a compartment by, for example, selectively adjusting the width defined by first attachment members 22 different from the width selected and defined by second attachment members 24.

Yet another feature of the disclosed system relates to space utilization. Because each compartment is defined or constructed by positioning clips at desired locations along the track, the number of compartments is also adaptable to a particular user's needs. To illustrate, attachment members can be removed as necessary to accommodate other equipment or larger tackle. In other words, because of the low profile of the system, i.e. the length, depth and height of the track and the removeability and versatile positioning of clips, other tackle can be stored in the boat's compartment in which the tackle management system is installed.

Still another feature of the disclosed system is that the tracks 18,20, the clips 22,24, and the track securing means can be assembled in a package (e.g., a bag or a box) and sold as a retrofit kit for installation in a boat compartment.

The tackle management system, in accord with the principles disclosed, generally assists users in organizing, placing, and storing tackle containers within the limited storage space of a boat. It is contemplated that this management system or organizer can be used in other applications requiring compartmentalized storage as well.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system of organizing fishing tackle for use in a boat, the system comprising:
   A) a first track secured to a first surface of the boat and a second track secured to a second surface of the boat, the first surface and the second surface being generally perpendicular to one another, each of the first and second tracks having track edges;
   B) a first securing structure and a second securing structure, the first and second securing structures functioning to secure the first and second tracks to the first and second surfaces;
   C) a plurality of attachment members, including at least a first attachment member and a second attachment member, each attachment member having a main portion with a front side and a back side, the front side including a divider and the back side including hook portions that hook over the track edges, the main portion of each first and second attachment members being flexibly configured so that the hook portions can be flexed away from one another to allow the hook portions to be hooked about the edges of the tracks at selected locations; and
   D) a plurality of storage compartments, the storage compartments being defined by the dividers of the attachment members, the compartments being adaptable to receive a variety of storage container widths and heights.

2. The system of claim 1, wherein the main portion further includes a pivot location located between the hook portions.

3. The system of claim 2, wherein the divider does not extend across the pivot location.

4. A tackle management kit that retrofits to a boat, the tackle management kit comprising:
   A) a rail system that is adapted to mount to the boat, the rail system including:
      i) at least a first rail and a second rail, the first rail having a first length, the second rail having a second length, the first length and the second length being substantially equal to one another; and
      ii) a first securing structure and a second securing structure, the securing structures operating to fixedly secure the first and second rails to the boat;
   B) a plurality of clips that removeably connect to the rails, the clips being adapted to connect at a plurality of locations along the lengths of the first and second rails, each clip comprising:
      i) a main portion having a front side and a back side;
      ii) a fin portion extending outwardly from the front side of the main portion; and
      iii) at least one attachment portion extending outwardly from the back side of the main portion for connecting the clip to the rail; and
   C) the fin portions of the clips extending only partially between the first and second rails, and defining a plurality of compartments, when the clips are mounted on the rails, widths of the compartments being adjustable by moving the clips.

5. The tackle management kit of claim 4, wherein the tackle management kit has an overall envelope having a height, a depth, and a length adapted for installation within existing storage compartments of the boat.

6. The tackle management kit of claim 5, wherein the tackle management kit is sized to mount within a side cavity of the boat.

7. The tackle management kit of claim 5, wherein the tackle management kit is sized to mount within a floor cavity of the boat.

8. The tackle management kit of claim 4, wherein the first and second securing structures comprise a plurality of through holes formed in each of the first rail and the second rail for receipt of fasteners.

9. The tackle management kit of claim 4, wherein the first and second securing structures comprise an adhesive layer adjacent a back side of each of the first and second rails, the adhesive layer extending along the length of the rails.

10. The tackle management kit of claim 4, wherein the first rail is secured to a first surface within a side compartment of the boat and the second rail is secured to a second surface within the side compartment of the boat, the first surface being generally perpendicular to the second surface.

11. The tackle management kit of claim 4, wherein the first rail is secured to a first surface within a floor compartment of the boat and the second rail is secured to a second surface within the floor compartment of the boat, the first surface being generally perpendicular to the second surface.

12. The tackle management kit of claim 4, wherein the plurality of clips includes at least first and second dividing clips and at least first and second retaining clips.

13. The tackle management kit of claim 12, wherein the first and second retaining clips include a retaining portion that forms a corner to retain an object within the compartment.

14. The tackle management kit of claim 4, wherein the plurality of compartments includes a first, second and third compartment, the first and second compartments being selectively positioned at one end of the length of the first and second rails and the third compartment being selectively positioned at the other end of the length of the first and second rails to provide a middle storage area located between the first and second compartment and the third compartment.

15. An onboard system of organizing fishing tackle, comprising:
   A) a first track;
   B) a second track adapted to be mounted substantially parallel to the first track;

C) a first attachment member and a second attachment member, the first and second attachment members detachably secured to the first track at selected positions, the first and second attachment members including:
  i) a base portion having a front side and a back side;
  ii) at least one connection portion located on the back side of the base portion, the connection portion configured to secure the attachment member to the first track;
  iii) a divider having a connected end and a free end, the divider being connected to the front side of the base portion at the connected end and extending outwardly to the free end; and
D) a third attachment member and a fourth attachment member, the third and fourth attachment members detachably secured to the second track at selected positions, the third and fourth attachment members including:
  i) a base portion having a front side and a back side;
  ii) at least one connection portion located on the back side of the base portion, the connection portion configured to secure the attachment member to the second track;
  iii) a divider having a connected end and a free end, the divider being connected to the front side of the base portion at the connected end and extending outwardly to the free end; and
  iv) a cornering extension that projects outwardly from the divider.

16. The onboard system of organizing fishing tackle of claim 15, wherein the second track is attached to a second surface at a first distance from a first surface, the first distance corresponding to a length of a container to be stored within the system.

17. The onboard system of organizing fishing tackle of claim 16, wherein the first track is attached to the first surface at a second distance from the second surface, the second distance corresponding to a height of the container to be stored within the system.

18. The system of organizing fishing tackle of claim 17, wherein the first and third attachment members are selectively positioned a third distance from the second and fourth attachment members, respectively, the third distance corresponding to a width of the container to be stored with the system.

19. A boat, comprising:
A) at least one storage location configured within the boat, the storage location including:
  i) a first surface; and
  ii) a second surface aligned at an angle relative to the first surface, the first and second surfaces intersecting at an edge;
B) a tackle organizer mounted at the storage location of the boat, the tackle organizer including:
  i) a first base member secured to the first surface of the boat and a second base member secured to the second surface of the boat;
  ii) first and second securing structures for securing the first and second base members to the first and second surfaces;
  iii) a plurality of divider members extending outwardly from the first and second base members; and
  iv) a plurality of storage compartments defined by the divider members, the compartments being adaptable to receive a variety of storage container widths and heights.

20. The boat of claim 19, wherein each divider member includes a main portion with a front side and a back side, the front side including a fin portion and the back side including connections, the main portion of each divider member being flexibly configured so that the connections of the divider member removeably couple the divider member to the base members.

21. The boat of claim 19, wherein at least some of the divider members have a T-shaped cross-section.

22. A method or organizing a plurality of utility boxes, the method comprising:
A) providing a management system, the management system comprising:
  i) a first track having a first length;
  ii) a second track having a second length;
  iii) a plurality of clips having connection portion to detachably couple the clips to the first and second tracks;
B) securing the first track to a first surface;
C) securing the second track to a second surface, the first surface being generally perpendicular to the second surface;
D) attaching a portion of the plurality of clips to the first track at selected first track positions;
E) attaching another portion of the plurality of clips to the second track at selected second track positions, the second track position corresponding to first track positions so that a plurality of compartments are formed by the plurality clips, the plurality of compartments corresponding to the number of plurality of utility boxes; and
F) positioning each of the plurality of utility boxes within one of the compartments formed by the plurality of clips.

23. The method of claim 22, wherein the first and second surfaces are defined by a storage area configured within a boat.

24. A system for organizing fishing tackle containers in a storage area of a boat, the system comprising:
A) a first track spaced apart from a second track, the tracks being located in the storage area of the boat;
B) dividers mounted to the tracks and extending only partially between the spaced apart first and second tracks, the dividers defining a plurality of compartments;
C) tackle storage boxes placed within the compartments, the dividers being positioned between sides of the tackle storage boxes; and
D) at least some of the dividers including corner structures that oppose ends of the tackle storage boxes.

* * * * *

UNITED STATES PATENT AND TRADEMARK OFFICE
CERTIFICATE OF CORRECTION

PATENT NO. : 6,574,911 B1
DATED : June 10, 2003
INVENTOR(S) : Hurst et al.

It is certified that error appears in the above-identified patent and that said Letters Patent is hereby corrected as shown below:

<u>Title Page,</u>
Item [75], Inventors, "Flippin, AZ" should read -- Flippin, AR --; and "Mountain Home, AZ" should read -- Mountain Home, AR --
Item [56], References Cited, OTHER PUBLICATIONS, "Let' EM Eat Weak" should read -- Let' EM Eat Wake --; and "butler Road" should read -- Butler Road --

<u>Column 1,</u>
Line 62, "of the, tackle" should read -- of the tackle --

Signed and Sealed this

Tenth Day of February, 2004

JON W. DUDAS
*Acting Director of the United States Patent and Trademark Office*